W. COTTRELL.
PANNING MOVEMENT.
APPLICATION FILED JULY 8, 1918.

1,332,864.

Patented Mar. 2, 1920.

Inventor
William Cottrell
by Westall and Wallace
his Attorneys.

UNITED STATES PATENT OFFICE.

WILLIAM COTTRELL, OF LOS ANGELES, CALIFORNIA.

PANNING-MOVEMENT.

1,332,864.    Specification of Letters Patent.    Patented Mar. 2, 1920.

Application filed July 8, 1918. Serial No. 243,903.

*To all whom it may concern:*

Be it known that I, WILLIAM COTTRELL, a citizen of the United States, residing at Los Angeles, in the county of Los Angeles and State of California, have invented new and useful Improvements in Panning-Movements, of which the following is a specification.

This invention relates to a mechanical movement especially adapted for a concentrating table, which separates minerals from their gangues by stratification induced by agitation.

It is an object of this invention to provide a movement whereby the speed of travel of the crushed ore over the table may be regulated independent of the amount and intensity of agitation, and the agitation independent of the travel. The amount and intensity of agitation and the speed of travel required for ores depends upon the differences of specific gravity, and other qualities of the constituent parts, and for efficient operation of the table these factors agitation and travel must be properly adjusted.

Figure 1:
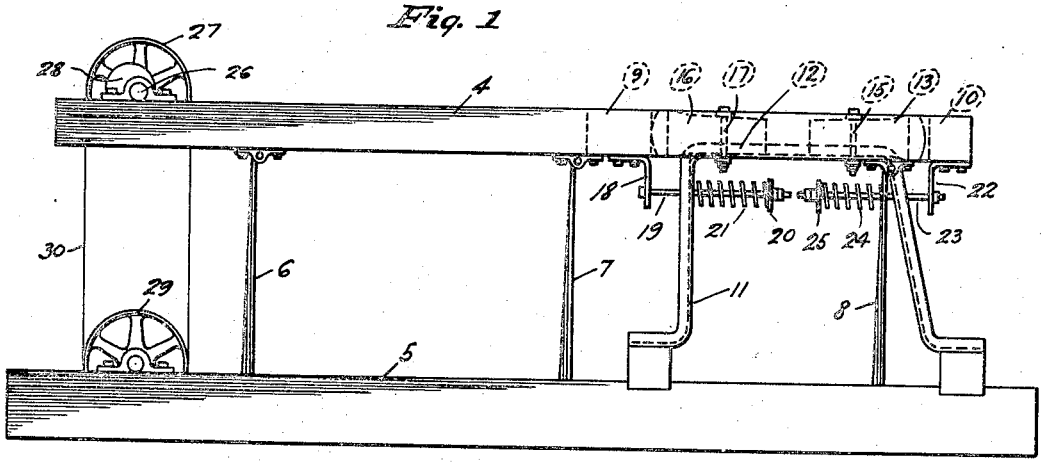
Figure 2:
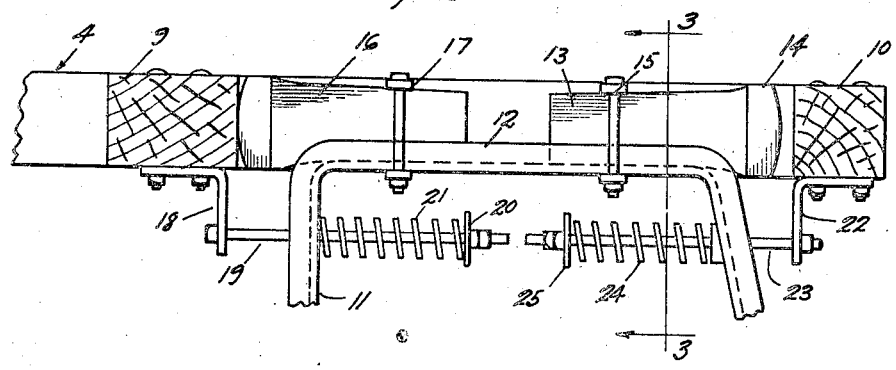
Figure 3:
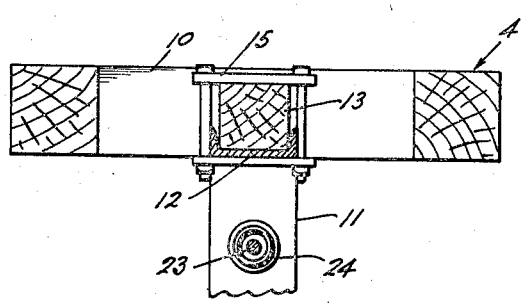

I accomplish these objects by means of the embodiment of my invention illustrated in the accompanying drawing, in which:

Figure 1 is a side elevation of my improved movement applied to a table, the details of the table not being shown. Fig. 2 is an enlarged detail view of the bumper construction. Fig. 3 is a section as seen on the line 3—3 of Fig. 2.

Referring more particularly to the drawing, the bed of a concentrating table is indicated by 4. This table is of the type which is reciprocated and separates minerals from ores by stratification. The table is supported upon a base 5 by means of leaf springs 6, 7 and 8. Extending transversely across the table bed are bumper beams 9 and 10.

Supported upon the base is a channel bar 11, which has a horizontal portion 12. Mounted in the channel is a tail buffer 13 having a resilient head 14, preferably of rubber. The upper face of buffer 13 is inclined so as to make it wedge shaped. Embracing the buffer and the channel bar is a clamp 15. The bumper beam 10 strikes the bumper head 14. Sliding of the bumper along the channel iron is prevented by reason of its wedge shape. Disposed in the channel bar oppositely to the tail buffer 13 is a head buffer 16, which is secured in position by a clamp 17. It will be noted that the head of buffer 16 normally rests against the bumper beam 9.

Secured to the under face of bumper beam 9 is an angle 18, and extending from the vertical leg thereof is a stem 19. The stem slidably extends through the channel iron 11 and is provided at its free end with a washer 20 held in place by nuts upon the threaded end of the stem. Between washer 20 and the angle bar is a compression spring 21. Secured to the under face of bumper beam 10 is an angle 22 from which extends a stem 23 in a direction opposite to stem 19. Stem 23 is slidably disposed in an opening in angle bar 11, and has a compression spring 24 disposed between washer 25 and the angle bar.

Journaled on the table bed 4 is a shaft 26, and secured to said shaft is a pulley 27. Fixed to shaft 26 is an eccentric 28. This eccentric serves as an overbalanced weight to reciprocate the table. Journaled on the base is a driving pulley 29. Passed over the pulleys 29 and 27 is a belt 30.

Bumper beam 9 is arranged so that it is normally pressed against the buffer 16 by the springs. Buffer 13 is adjusted to leave a gap between it and the bumper beam 10. Upon rotation of shaft 26, the eccentric 28, being overbalanced, causes the table to reciprocate. The table is moved to the left against the action of supporting springs 6, 7 and 8, which act as primary concussion springs. The supporting springs assist the eccentric in moving the table to the right, whereupon the bumper beam 9 comes in violent contact with the buffer 16. The intensity of the jolt given to the table is roughly adjusted by moving the buffer and adjusting its pressure against the bumper beam, when in normal position. A finer adjustment may now be made by increasing or decreasing the compression of spring 21, which acts as a secondary concussion spring. Adjustment may also be made by changing the eccentric 28. If the travel of the crushed ore over the table is found to be too fast, then tail buffer 13 is adjusted to come in contact with bumper beam 10 on movement of the table to the left. The intensity of the jolt and the distance to which the ore will be carried backward is regulated by the position of buffer 13 and the tension of spring 24.

The ore is first carried forward along the table by the jolt of head buffer 16 against bumper beam 9, then carried backward by the jolt of tail buffer 13 against bumper beam 10. The difference in travel of the ore forward and backward determines the speed with which it passes over the table. The intensity of the jolt is regulated by the spring pressure. By proper adjustment for a given ore, the maximum stratification can be obtained.

What I claim is:

1. A mechanical movement comprising the combination of a reciprocable member having a head bumper, a stationary head buffer, spring means normally holding said head bumper in contact with said head buffer, a tail bumper on said member, a stationary tail buffer for engagement with said tail bumper, and means to reciprocate said member.

2. A mechanical movement comprising the combination of a reciprocable member having a head bumper, a stationary head buffer, spring means normally holding said bumper in contact with said head buffer, adjustable means for regulating the pressure of said head bumper against said head buffer, a tail bumper on said member, a stationary tail buffer for engagement with said tail bumper, and means to reciprocate said member.

3. A mechanical movement comprising the combination of a reciprocable member having a head bumper, spring supports for said member resisting reciprocating movement thereof, a stationary head buffer normally in contact with said head bumper, a tail bumper on said member, a stationary tail buffer for engagement with said tail bumper, and means to reciprocate said member.

4. A mechanical movement comprising the combination of a reciprocable member having a head bumper, spring supports for said member resisting reciprocating movement thereof, an adjustable head buffer normally in contact with said head bumper, a tail bumper on said member, a stationary tail buffer for engagement with said tail bumper, and means to reciprocate said member.

5. A mechanical movement comprising the combination of a reciprocable member having a bumper, a stationary buffer, spring means normally holding said bumper in contact with said buffer, an adjustable secondary spring tending to hold said bumper and buffer in contact, and means to reciprocate said member.

6. A mechanical movement comprising the combination of a reciprocable member having a bumper, spring supports for said member resisting reciprocating movement thereof, a stationary buffer normally in contact with said bumper, an adjustable secondary spring tending to hold said bumper and buffer in contact, and means to reciprocate said member.

7. A mechanical movement comprising the combination of a reciprocable member having a bumper, spring supports for said member resisting reciprocating movement thereof, an adjustable buffer normally in contact with said bumper, an adjustable secondary spring tending to hold said bumper and buffer in contact, and means to reciprocate said member.

In witness that I claim the foregoing I have hereunto subscribed my name this 1st day of July, 1918.

WILLIAM COTTRELL.